US009530077B2

(12) United States Patent
Vincent et al.

(10) Patent No.: US 9,530,077 B2
(45) Date of Patent: Dec. 27, 2016

(54) IMAGE ANALYSIS (75) Inventors: Graham Richard Vincent, Manchester (GB); Michael Antony Bowes, Derbyshire (GB); Gwenael Alain Guillard, Stockport (GB); Ian Michael Scott, Stockport (GB)

(73) Assignee: Imorphics Limited (GB)

( * ) Notice: Subject to any disclaimer, the term of this patent is extended or adjusted under 35 U.S.C. 154(b) by 1243 days.

(21) Appl. No.: 12/703,438

(22) Filed: Feb. 10, 2010

(65) Prior Publication Data
US 2011/0194739 A1   Aug. 11, 2011

(51) Int. Cl.
G06K 9/00   (2006.01)
G06K 9/62   (2006.01)

(52) U.S. Cl.
CPC .......... G06K 9/6247 (2013.01); G06K 9/6209 (2013.01)

(58) Field of Classification Search
CPC ........ G06Q 50/22; G06Q 50/24; G06T 7/0014
See application file for complete search history.

(56) References Cited

U.S. PATENT DOCUMENTS

| 6,324,299 | B1 * | 11/2001 | Sarachik et al. ............ 382/151 |
| 7,584,080 | B2 | 9/2009 | Taylor et al. |
| 2006/0008149 | A1 | 1/2006 | Tu et al. |
| 2009/0116749 | A1 * | 5/2009 | Cristinacce et al. .......... 382/195 |

FOREIGN PATENT DOCUMENTS

| JP | H08-101915 | | 4/1996 |
| JP | 2002015338 | A | 1/2002 |
| JP | 2002183732 | | 6/2002 |
| JP | 2007000267 | A | 1/2007 |
| JP | 2007513649 | A | 5/2007 |
| WO | 2004111937 | A1 | 12/2004 |
| WO | 2007116208 | A1 | 10/2007 |

OTHER PUBLICATIONS

T.F. Cootes and C.J. Taylor, Statistical Models of Appearance for Computer Vision, Imaging Science and Biomedical Engineering, Mar. 8, 2004, http://www.isbe.man.ac.uk, University of Manchester, Manchester, UK.
T.F. Cootes, G.J. Edwards, and C.J. Taylor, Active Appearance Models, Wolfson Image Analysis Unit, Department of Medical Biophysics, University of Manchester, Manchester, UK, http://www.wiau.man.ac.uk.
Zhiqiang Lao, Dinggang Shen, Christos Davatzikos, Statistical Shape Model for Automatic Skull-Stripping of Brain Images, Department of Radiology, John Hopkins University, Baltimore, Maryland.

(Continued)

Primary Examiner — Eliza Lam
(74) Attorney, Agent, or Firm — Lerner, David, Littenberg, Krumholz & Mentlik, LLP (57) ABSTRACT A computer-implemented method for identifying features in an image. The method comprises fitting a plurality of second models to the image, the plurality of second models together modelling a region of interest, wherein each part of the region of interest is modelled by at least two of the plurality of second models; and identifying the features in the image based upon the fit of the plurality of second models.

63 Claims, 5 Drawing Sheets (56) References Cited

OTHER PUBLICATIONS

Roberts M.G . Cootes T. F. and Adams J. E.: "Linking Sequences of Active Appearance Sub-Models via Constraints: an Application in Automated Vertebral Morphometry", Proceedings of BMVC2003. vol. 1. 2003, pp. 349-358, XP002653943, the whole document.
Cristinacce D., Cootes T. and Scott I.: "A Multi-Stage Approach to Facial feature Detection", Proc. British Machine Vision Conference, vol. 1, 2004, p. 10PP, XP002653944, the whole document.
Cristinacce D et al: "A Comparison of Shape Constrained Facial Feature Detectors", Proceedings of the International Conference on Automatic Faceand Gesture Recognition, Jan. 1, 2004 (Jan. 1, 2004), pp. 375-380, XP008059876, the whole document.
Vukadinovic D et al: "Fully Automatic Facial Feature Point Detection Using Gabor Feature Based Boosted Classifiers", Systems, Man and Cybernetics, 2005 IEEE International Conference on, vol. 2, Oct. 10, 2005 (Oct. 10, 2005), pp. 1692-1698. XP010873930, IEEE, Piscataway, NJ, USA DOI: 10.1109/ICSMC.2005.1571392 ISBN: 978-0-7803-9298-4 the whole document.
Bernd Heisele et al: A Component-based Framework for Face Detection and Identification, International Journal of Computer Vision, vol. 74. No. 2, Dec. 19, 2006 (Dec. 19, 2006), pp. 167-181, XP019509439, Kluwer Academic Publishers, BO ISSN: 1573-1405 the whole document.
Liebe B ., Leonardis A. and Schiele B.: "Combined Object Categorization and Segmentation with an Implicit Shape Model", ECCV 2004 Workshop on Statistical Learning in Computer Vision, May 2004 (May 2004), XP002653945, Prague the whole document.
Cristinacce D et al: "Automatic feature localisation with constrained local models", Pattern Recognition, vol. 41, No. 10, Oct. 1, 2008 (Oct. 1, 2008), pp. 3054-3067, XP022764996, Elsevier, GB ISSN: 0031-3203, DOI: 10.1016/J.PATCOG.2008.01.024 [retrieved on Feb. 19, 2008] the whole document.
Kauffman J.A.: "Automated Radiographic Assessment of Hands in rheumatoid Arthritis", PhD Dissertation, Twente University, May 7, 2009 (May 7, 2009), pp. 47-69, XP002653946, the whole document.
International Search Report for Application No. PCT/GB2011/000157 dated Aug. 18, 2011.
Office Action from the Japanese Intellectual Property Office for Application No. 2007513649 dated Oct. 6, 2016 (12 pages).
Office Action from the Japan Patent Office for Application No. 2012-552455 dated Jan. 13, 2015 (8 pages).

\* cited by examiner

IMAGE ANALYSIS

The present invention relates to methods and apparatus for identifying features in an image. More particularly, but not exclusively, the present invention relates to methods and apparatus for fitting models to an image to identify features in the image.

Automated image analysis may be used to reduce manual workloads in determining properties of images. Image analysis is used in a variety of different fields to identify features of images. One area in which image analysis techniques are used is to process medical images where the identification of anatomical features in an image can provide useful information to medical practitioners. Often many images are required to be processed, for example in a screening program, and each image should be processed as accurately as possible.

Images of a particular anatomical feature obtained from different patients vary considerably. This may particularly be the case when an anatomical feature is in a diseased state. It can therefore be difficult to accurately identify anatomical features in images given such variance. An existing approach to identifying anatomical features in an image is based upon statistical modelling of an anatomical region of interest. Statistical models are generated from a training set of images in which features within the anatomical region of interest have been manually identified and a statistical model indicates a mean model and an acceptable degree of variation from the mean model, as indicated by the training set. Where a small number of training images are available, a statistical model can often fail to identify particular anatomical features in previously unseen images due to the failure of the statistical model to capture a true indication of acceptable variation.

Additionally, existing approaches for fitting statistical models to previously unseen images can be inaccurate, particularly when an anatomical feature is in a diseased state in the previously unseen image. A robust and accurate method of modelling structures in images and fitting such models to previously unseen images is therefore desirable.

It is an object of some embodiments of the present invention to obviate or mitigate at least some of the problems set out above.

According to a first aspect of the invention there is provided a computer-implemented method for identifying features in an image. The method comprises fitting a plurality of second models to the image, the plurality of second models together modelling a region of interest, wherein each part of the region of interest is modelled by at least two of the plurality of second models; and identifying the features in the image based upon the fit of the plurality of second models.

Fitting a plurality of second models to an image allows localised regions to be individually modelled. The local nature of the second models can allow a more accurate fit to the image. By including parts of the region of interest to be modelled in more than one of the second models, if the fit of any one of the second models to a particular region is unacceptable, another of the second models that models the particular region can be used.

The method may further comprise initially fitting a first model of the object to the image and fitting the plurality of second models may be based upon the fitting of the first model.

Fitting the plurality of second models to the image may be initialised based upon the fitting of the first model. Initialising the fitting of models based upon a fit of a first model or models in this way allows information determined from fitting a first model to guide a fitting of subsequent models. Alternatively or additionally fitting the plurality of second models may be limited by the fitting of the first model.

Identifying features in the image based upon the fit of the plurality of second models may comprise combining data based upon the fit of the plurality of second models.

Combining data based upon the fit of the plurality of second models may comprise, for each part of the region of interest included in at least two of the plurality of models, applying an associated weight to data derived from each of the plurality of second models in which the part is included. For a particular second model, the associated weight may be based upon a distance of the part of the region from a point defined with respect to the particular second model. The point defined with respect to the particular second model may be defined with respect to a centre of the particular second model, for example the centre of a region modelled by a particular second model.

A particular feature may be modelled by two of the second models and the combining may identify the particular feature by combining data associated with the particular feature generated by fitting each of the two of the second models. The combining may be based upon stored data indicating a plurality of relationships, each relationship being between at least part of a second model and at least part of at least one other second model. For example, each point in a particular second model may have a relationship with any point in any other second model that represents a corresponding point in a region of interest. The stored data indicating a plurality of relationships may indicate a relationship between at least part of a second model and part of the first model.

The combining may comprise, for each part of the region of interest included in at least two of the plurality of second models, determining a weighted average fit for the part of the region of interest based upon the fit of each of the at least two of the plurality of second models to the part of the region of interest.

Identifying the features in the image based upon the fit of the plurality of second models may further comprise determining an estimate of location of the features in the image based upon the fit of the plurality of second models. Determining an estimate of location of features in the image may comprise obtaining an initial estimate of location of the features in the image and updating the initial estimate based upon the fit of the plurality of second models. In this way, an initial estimate of location of the features in an image may be refined based upon subsequent fits of models Updating the initial estimate may comprise updating the initial estimate based upon the fit of one of the second models if the fit of the one of the second models satisfies a predetermined criterion. The predetermined criterion may be a relationship between the initial estimate of location of the features and the fit of the one of the second models. The predetermined criterion may comprise a geometric criterion. The predetermined criterion may be determined for the one of the second models during a training phase, based upon a set of training images. The predetermined criterion may be based upon a plurality of data items, each data item representing a fit of the one of the second models to a respective one of the training images. Each of the plurality of second models may have an associated predetermined criterion.

The method may further comprise fitting a plurality of third models to the image, the plurality of third models together modelling at least part of the region of interest, the fitting the plurality of third models being based upon the estimate of location of the features, and identifying the features in the image based upon the fit of the plurality of third models. The estimate of location of the features may be used to initialise the third models in the image. The estimate of location of the features may be updated based upon the fit of the plurality of third models. Features in the image may be identified based upon the updated estimate of location of features. Further pluralities of models may be fitted to the image based upon the estimate of location of the features, with the estimate of location of the features updated after fitting each plurality of models.

A given part of the region of interest may be modelled by a first number of the second models and a second different number of the third models. The second number may be greater than the first number. Models in the third plurality of models may generally model smaller regions than models in the second plurality of models. In this way increasingly localised regions of the image may be modelled and a more accurate fit to the image may be achieved.

The method may further comprise generating the plurality of second models. A training set of images may be received, each image in the training set of images representing the region of interest, and generating the plurality of second models of the object may based upon the training set of images. Each model in the plurality of second models may be generated based upon a subset of images in the training set of images, the subset being selected by randomly sampling with replacement from the training set of images.

Generating the plurality of second models may comprise generating a plurality of models, each of the plurality of models modelling at least part of the region of interest; processing the plurality of models with respect to a further training set of images; and selecting a subset of the plurality of models based upon the processing such that each part of the region of interest is represented by a plurality of models in the subset of models.

Generating the plurality of second models may further comprise generating a first plurality of second models such that each part of the region of interest is modelled by a plurality of the first plurality of second models; generating a second plurality of second models such that each part of the region of interest is modelled by a plurality of the second plurality of second models; processing the first plurality of second models and the second plurality of second models with respect to the further training set of images; and selecting one of the first plurality and the second plurality of second models of the region of interest based upon the processing. Processing the first plurality of second models and the second plurality of second models with respect to a training set of images may comprise fitting the first plurality of second models to each image in the further training set of images; and fitting the second plurality of second models to each image in the further training set of images; and selecting one of the plurality of second models of the region of interest based upon the processing may be based upon the fittings.

Generating the or each plurality of second models may comprise receiving data indicating a plurality of points of interest within the region of interest; and generating the or each plurality of second models based upon the received plurality of points of interest. Generating the or each plurality of second models based upon the received data may comprise, for each of the received points of interest, selecting a part of the region of interest of predetermined size to provide a basis for one of the plurality of models. Each part of the region of interest may represent a feature of interest.

Generating the plurality of second models of the object based upon the training set of images may comprise, for each of the plurality of points, processing a corresponding part of the region of interest in each image in the training set of images.

According to a second aspect of the invention there is provided a computer-implemented method for identifying features in an image. The method comprises fitting a plurality of second models to the image, the plurality of second models together modelling a region of interest; fitting a plurality of third models to the image, the plurality of third models together modelling at least part of the region of interest, the fitting of the plurality of third models being based upon the fit of the plurality of second models; and identifying the features in the image based upon the fit of the plurality of third models.

In this way, a fit to the image in a given region may be modified based upon fits of different sets of models. Such a method provides a way of refining identification of an object in an image. Further pluralities of models may be fitted to the image based upon previous pluralities of models to further refine the identification.

A given part of the region of interest may be modelled by a first number of second models and a second different number of third models. The second number may be greater than said first number. Some or all of the third number of models may model a smaller region than some or all of the second number of models and so each of the third plurality of models may model a more localised part of the region of interest. Improved modelling of the region of interest may thereby be achieved.

The method may further comprise initially fitting a first model of the region of interest to the image and fitting the plurality of second models may be based upon the fitting of the first model. Fitting the plurality of second models to the image may be initialised based upon the fitting of the first model and fitting the plurality of third models to the image may be initialised based upon the fitting of the first model. As indicated above, initialising models based upon a fit of previous models in this way allows information determined from fitting the previous models to guide the subsequent fitting.

Each region of the object may be represented by a plurality of the plurality of second models. Advantages described for the first aspect of the invention may therefore also be achieved in the second aspect of the invention.

According to a third aspect of the invention there is provided a computer-implemented method for identifying features in an image. The method comprises determining an estimate of location of the features in the image; fitting a second model to part of the image; and updating the estimate based upon the second model if the fit of the second model satisfies a predetermined criterion.

In general terms, it is often possible to provide a reasonably good estimate of the location of features in an image. Fitting a second model to part of the image allows the part of the image to be more accurately modelled. However if the second model indicates that the initial estimate should be updated by a large amount then it may be assumed that the fitting of the second model has failed and the estimate may therefore not be updated. As such, the predetermined criterion may be based upon a difference between the estimate and the fit of the second model.

The predetermined criterion may be a relationship between the estimate of location of the features and the fit of the second model. The predetermined criterion may comprise a geometric criterion, for example a maximum distance between the points modelled by the second model after fitting and corresponding points in the estimate of location of the features or a maximum amount of rotation of part of the image modelled by the second model and a corresponding part of the estimate of location, or a combination of both. The predetermined criterion may be determined for the second model during a training phase, based upon a set of training images. The predetermined criterion may be based on a plurality of data items, each data item representing a fit of the second model to a respective one of said training images. That is, the second model may be fitted to a plurality of training images and the fit of the second model to each training image may be classified as a "good" or "bad" fit. The classified fits may be used to train a classifier for determining whether a particular fit of a second model is an acceptable fit.

The method may further comprise fitting a first model to the image and the estimate of location of the features in the image may be based upon the fit of the first model.

Fitting the second model to part of the image may be based upon the estimate of location of the features. Additionally, fitting the second model to part of the image may be initialised based upon the estimate of location of the features.

Fitting a second model to part of the image may comprise fitting a plurality of second models to the image, and each of the plurality of second models may have an associated predetermined criterion. That is, a criterion for a particular second model may allow the particular second model to vary a relatively large amount from a starting position compared to a different second model.

According to a fourth aspect of the invention there is provided a computer-implemented method of generating a plurality of second models that together model a region of interest. The method comprises generating the plurality of second models such that each part of the region of interest is modelled by a plurality of the plurality of second models.

As indicated above, by including regions of a region of interest to be modelled in more than one of the second models, if the fit of any one of the second models to a particular region is unacceptable, another of the second models that models the particular region can be used when the second models are used to model the region of interest.

The method may further comprise receiving a training set of images, each image in the training set of images representing the region of interest and generating the plurality of second models of the object may be based upon the training set of images. Each model in the plurality of second models may be generated based upon a subset of images in the training set of images, the subset being selected by randomly sampling with replacement from the training set of images.

Generating the plurality of second models may comprise: generating a plurality of models, each of said plurality of models modelling at least part of the region of interest; processing the plurality of models with respect to a further training set of images and selecting a subset of the plurality of models based upon said processing such that each part of the region of interest is represented by a plurality of models in the subset of models.

Given that models are determined in an initial stage, and are generally only determined once for a particular region of interest, a relatively large amount of time can be spent in optimising the selected models. As such, many different models can be generated in any convenient way and the efficacy of each generated model in fitting to the region of interest can be tested using a further training set of images. Models found to optimally fit to a region of interest may be retained while other models are rejected.

Generating the plurality of second models may comprise: generating a first plurality of second models such that each part of the region of interest is modelled by a plurality of the first plurality of second models; generating a second plurality of second models such that each part of the region of interest is modelled by a plurality of the second plurality of second models; processing the first plurality of second models and the second plurality of second models with respect to the further training set of images; and selecting one of the first plurality of second models and second plurality of second models of the region of interest based upon the processing.

Processing the first plurality of second models and the second plurality of second models with respect to a training set of images may comprise: fitting the first plurality of second models to the object; and fitting the second plurality of second models to the object; and selecting one of said plurality of second models of the object based upon the processing may be based upon the fittings.

Generating the or each plurality of second models may comprise receiving data indicating a plurality of points of interest within the region of interest and generating the or each plurality of second models based upon the received plurality of points of interest. The points of interest may be selected in any convenient way. For example, each point of interest may be indicative of a feature of interest such as, for example, features of the region of interest and/or regions known to be of greatest curvature in the region of interest. In this way, particular features which it is particularly desirable to accurately model can be selected so as to fall at the centre of a model, and therefore be more accurately modelled.

Generating the or each plurality of second models based upon the received data may comprise, for each of the received points of interest, selecting a part of the region of interest of a predetermined size to provide a basis for one of the plurality of models. Each part of the region of a predetermined size may be centred on one of the received points of interest.

Generating the plurality of second models of the object based upon the training set of images may comprise, for each of the plurality of points, processing a corresponding part of the region of interest in each image in the training set of images.

In each of the aspects the models may be any suitable description of shape and/or image characteristics which can be fitted to an image. For example, the models may be rigid models that may be fitted to an image by changing the position and/or rotation of the models to determine a best fit to the image. Alternatively the models may be deformable models. Deformable models are models in which shape of a region may be changed within predetermined constraints in order to effectively fit the models to the image. Examples of deformable models are statistical models such as shape or appearance models, deformable templates and deformable atlases. Where the models are appearance models they may represent a volume or a surface.

The or each image may be an image selected from the group consisting of: a computed topography image, a magnetic resonance image, a radiograph image, an x-ray image and an ultrasound image. The fitting may comprise applying a fitting technique selected from the group consisting of: rigid registration, non-rigid registration, active shape modelling and active appearance modelling. The plurality of second models may represent an arbitrary decomposition of the object. The region of interest may be a part of a body.

The term "features" is used herein to indicate any part of an image which is to be identified. For example a feature may be an image region, an image boundary, an image surface or a point in an image In the case where the region of interest is a part of a body the features may be anatomical features. Examples of anatomical image regions include a region indicative of bone such as a femur, a region indicative of an organ or part of an organ (for example a region indicative of the frontal lobe), regions indicative of abnormalities (for example regions indicative of cysts or regions indicative of pathological bone growth). Examples of anatomical boundaries and surfaces include bone/cartilage boundaries and/or surfaces and ventricle/cerebrospinal fluid boundaries and/or surfaces. An example of an anatomical point in an image is an iliac crest.

Aspects of the invention can be implemented in any convenient form. For example computer programs may be provided to carry out the methods described herein. Such computer programs may be carried on appropriate computer readable media which term includes appropriate tangible storage devices (e.g. discs). Aspects of the invention can also be implemented by way of appropriately programmed computers.

Features described in the context of one aspect can be used in the context of another aspect.

Embodiments of the present invention will now be described, by way of example only, with reference to the accompanying drawings, in which.

Figure 1:
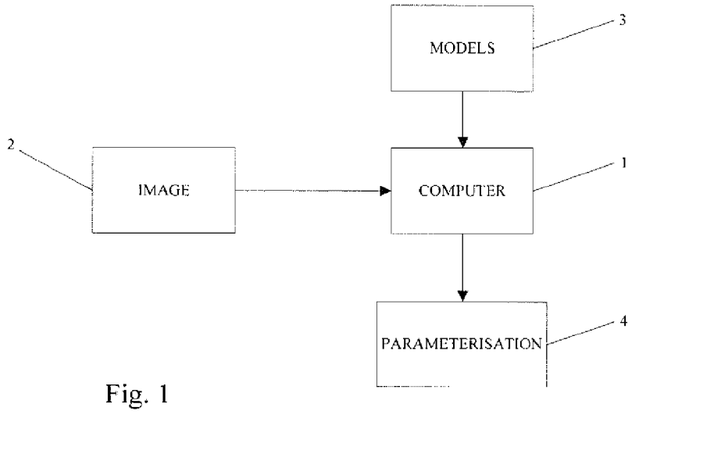
FIG. 1 is a schematic illustration of a system for analysis of images according to an embodiment of the present invention.

Referring now to FIG. 1, a computer 1 is arranged to receive an image 2 of an object or objects and to receive a model 3. The model 3 is fitted to the image 2 to generate a parameterisation of the model 4. The model 3 is a statistical model such as an active appearance model or active shape model, which has been created based upon a training set of images of an object of the same class as the object that is the subject of image 2. The model 3 is a statistical model of the variation within the training images and is generated by processing the training set of images to generate a mean model and a range of variation from the mean model of the training set. The parameterisation 4 generated by computer 1 can be used to identify features of the image.

Figure 1A:
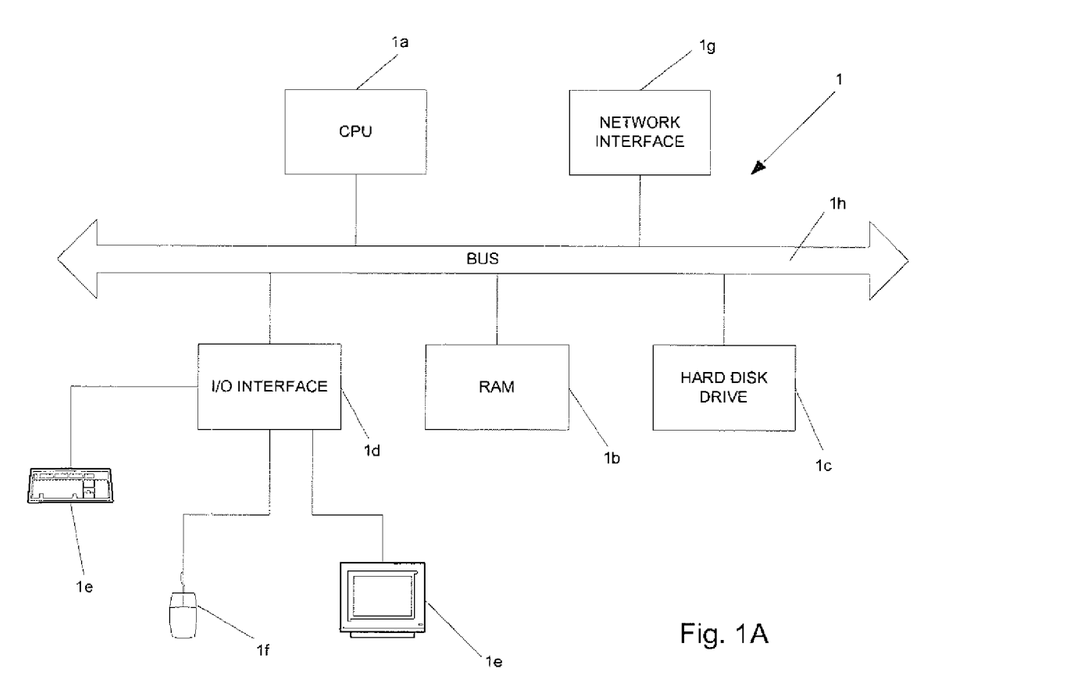
FIG. 1A is a schematic illustration showing a computer of the system of FIG. 1 in further detail.

FIG. 1A shows the computer 1 in further detail. It can be seen that the computer comprises a CPU $1a$ which is configured to read and execute instructions stored in a volatile memory $1b$ which takes the form of a random access memory. The volatile memory $1b$ stores instructions for execution by the CPU $1a$ and data used by those instructions. For example, in use, the image 2 and model 3 may be stored in the volatile memory $1b$.

The Computer 1 further comprises non-volatile storage in the form of a hard disc drive $1c$. The image 2 and model 3 may be stored on the hard disc drive $1c$. The computer 1 further comprises an I/O interface $1d$ to which is connected peripheral devices used in connection with the computer 1. More particularly, a display $1e$ is configured so as to display output from the computer 1. The display $1e$ may, for example, display a representation of the image 2. Additionally, the display $1e$ may provide data representing the parameterisation 4 to a user and may display an input image 2 overlaid with the parameterisation 4. Input devices are also connected to the I/O interface $1d$. Such input devices include a keyboard $1e$ and a mouse if which allow user interaction with the computer 1. A network interface $1g$ allows the computer 1 to be connected to an appropriate computer network so as to receive and transmit data from and to other computing devices. The CPU $1a$, volatile memory $1b$, hard disc drive $1c$, I/O interface $1d$, and network interface $1g$, are connected together by a bus $1h$.

Figure 2:
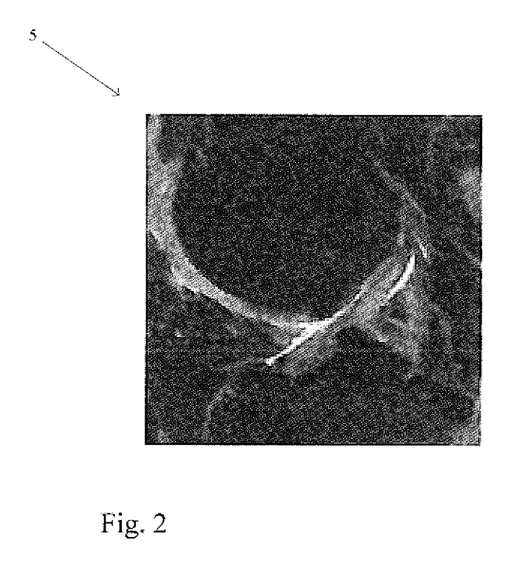
FIG. 2 is an image suitable for processing using the system of FIG. 1.

Referring now to FIG. 2 an image suitable for processing by the system of FIG. 1 is shown. FIG. 2 is a slice through a Magnetic Resonance (MR) volume image of the knee. The system of FIG. 1 is able to process different kinds of images in the same way. For example, images derived from annotated data such as three-dimensional surfaces or images of anatomical volumes can be processed in the manner described below.

The processing described below makes reference to a model $M_1$, built based upon a training set of images. The model $M_1$ is a statistical model built based upon a training set of images and is a model of features of interest in an image I, as set out above. In order to aid the understanding of the description of the invention below, generation of the model $M_1$ and fitting of model $M_1$ to an image I will first be described. It will be appreciated however that the generation and fitting of the model $M_1$ can be carried out in any convenient way. For example, the model $M_1$ can be generated using a parameterisation technique described in U.S. Pat. No. 7,584,080, the contents of which are herein incorporated by reference.

The model $M_1$ is generated from a training set of images by first manually marking corresponding predetermined points of interest in each of the images in the training set of images. The set of points of interest are selected based upon features of the object to be modelled. For example, if the object to be modelled is a knee joint, points of interest may be selected based upon anatomical features of the knee joint. The model $M_1$ may be, for example, a shape model or an appearance model, which are both described below. It will be appreciated, however, that other models may be used such as for example, deformable templates or deformable atlases which take the form of a typical or average example which is allowed to deform within a set of constraints. A review of deformable models is given in Tim McInerney and Demetri Terzopoulos "Deformable Models in Medical Image Analysis: A Survey", Medical Image Analysis, 1(2): 91-108, 1996 the contents of which is herein incorporated by reference.

In the case where the model $M_1$ is a shape model, the set of points of interest associated with each training image, selected in the manner described above, is represented by a shape vector comprising a concatenation of the coordinates of the selected points. The shape vector x for a particular training image takes the form:

$$x = (x_1, y_1, x_2, y_2, \ldots, x_n, y_n) \tag{1}$$

where n is the number of points of interest in each image.

A mean shape vector $\bar{x}$ can be calculated according to equation (2):

$$\bar{x} = \frac{1}{N}\sum_{i=1}^{N} x_i \qquad (2)$$

Where N is the number of training images; and
$X_i$ is a vector representing a training image i A plurality of shape vectors, one for each training image can be used to generate a matrix X, in which each row represents a shape vector.

Each of the shapes represented by the points selected in a respective training image is translated, rotated and scaled so that their centroids coincide and the sum of squared differences between the points in each image and those on the mean shape is minimised.

A covariance matrix S can be created from the aligned shapes by first calculating the mean shape vector using equation (2). For each image in the training set, the deviation from the mean shape can be calculated from equation (3):

$$dx_i = x_i - \bar{x} \qquad (3)$$

The covariance matrix S is then calculated using equation (4):

$$S = \frac{1}{N}\sum_{i=1}^{N} dx_i dx_i^T \qquad (4)$$

The eigenvectors of the matrix S can be determined and a matrix P of the t most significant eigenvectors can be created.

In this way, any shape can be represented according to the shape model given by equation (5):

$$x = \bar{x} + P_s b_s \qquad (5)$$

where x is a vector representing the shape;
$\bar{x}$ is a mean shape vector generated from shape vectors of images in the training set (according to equation (2));
$P_s$ is the matrix of eigenvectors described above; and
$b_s$ is a t-element vector of weights to be applied to eigenvectors of the matrix $P_s$ to generate the vector x for the shape.

The components of $b_s$ ($b_i$, i=1 . . . t) are referred to as shape parameters. The eigenvectors $P_i$ are sorted according to their eigenvalues $\lambda_i$, which describe the observed variance over the training shapes associated with each eigenvector. That is to say the $\lambda_i$ represent the proportions of variance from the mean shape that are described by each of the eigenvectors. By selecting a value of t ($\leq$N), the model can be made to represent some chosen proportion of the total variance observed in the training shapes.

Each eigenvector included in the matrix $P_s$ represents a mode of variation of the modelled shape. Varying values of elements of the vector $b_s$ allows generation of shapes within the range observed within images of the training images. That is, variation of one element b1 of the vector $b_s$ will affect one characteristic of the modelled shape, while variation of a second element b2 will affect a different characteristic of the modelled shape.

An appearance model is an extension of the shape model described above. To build a statistical model of the grey-level appearance after the points selected in a respective training image are translated, rotated and scaled so that their centroids coincide and the sum of squared differences between the points in each image and those on the mean shape is minimised, as described above, grey-level information $g_{im}$ is sampled from the image over the region covered by the mean shape $\bar{x}$, after normalising the image to minimise the effect of global lighting variation. Applying the method set out above to determine the shape model (5) to the grey-level data, a grey-level model is obtained, as shown in equation (6):

$$g = \bar{g} + P_g b_g \qquad (6)$$

where:
$\bar{g}$ is the mean normalised grey-level vector;
$P_g$ is a matrix of eigenvectors; and
$b_g$ is a set of grey-level parameters.

Varying values of elements of the vectors $b_s$ (in equation (5)) and $b_g$ (in equation (6)) allows generation of shapes and grey-level images within the range observed within images of the training images.

In order that the relationship between shape and grey-level variation in the training images is captured, a vector b is generated for each training image according to equation (7):

$$b = \begin{pmatrix} W_s b_s \\ b_g \end{pmatrix} = \begin{pmatrix} W_s P_s^T (x - \bar{x}) \\ P_g^T (g - \bar{g}) \end{pmatrix} \qquad (7)$$

where:
$W_s$ is a diagonal matrix of weights associated with each shape parameter in the vector $b_s$.

The matrix $W_s$ adjusts values of $b_s$ to allow for the difference in units between the shape and grey level models.

A further model shown in equation (8) is generated from the set of concatenated vectors b, using the method described above to generate models (5) and (6).

$$b = Qc \qquad (8)$$

where:
Q is a matrix of eigenvectors; and
c is a vector of appearance parameters.

Since the model of equation (8) is linear, shape and grey-levels may be expressed directly as functions of c according to equation (9).

$$x = \bar{x} + P_s W_s Q_s c, \quad g = \bar{g} + P_g Q_g c \qquad (9)$$

where the matrix of eigenvectors $$Q = \begin{pmatrix} Q_s \\ Q_g \end{pmatrix}.$$

An example image can be synthesised for a given c by generating the shape-free grey-level image from the vector g and warping it using the control points described by x.

In general terms, the aim of model fitting is to determine the set of parameters c which best fit the model to an unseen image. One way to do this is by using active appearance models which are described below.

An active appearance model uses the difference between a reconstructed image generated by the model and the underlying target image I, to iteratively drive the model parameters towards better values. In a prior learning stage, known displacements to the vector of appearance parameters, $\delta c$, are applied to known model instances and the resulting difference between model and image, $\delta I = I_i - I_m$, is measured, where $I_i$ is a vector of grey-level values in the image I and $I_m$ is a vector of grey-level values for the current model parameters c. Multivariate linear regression is applied to a large set of such training displacements and an approximate linear relationship, $\delta c = A \delta I$, is established.

To identify the best match between the model and image I the magnitude of the difference vector $\Delta = |\delta I|^2$ is minimised using the linear relationship learnt during the learning stage to predict an adjustment to the model parameters c which improves model fit. The model parameters c are repeatedly adjusted until no improvement is made to $\Delta$. Active appearance models are described in detail in T. F. Cootes, C. J. Edwars, C. J. Taylor "Active Appearance Models", IEEE Transactions on Pattern Analysis and Machine Intelligence, 2001, Volume 23, Issue 6, which is herein incorporated by reference.

Figure 3:
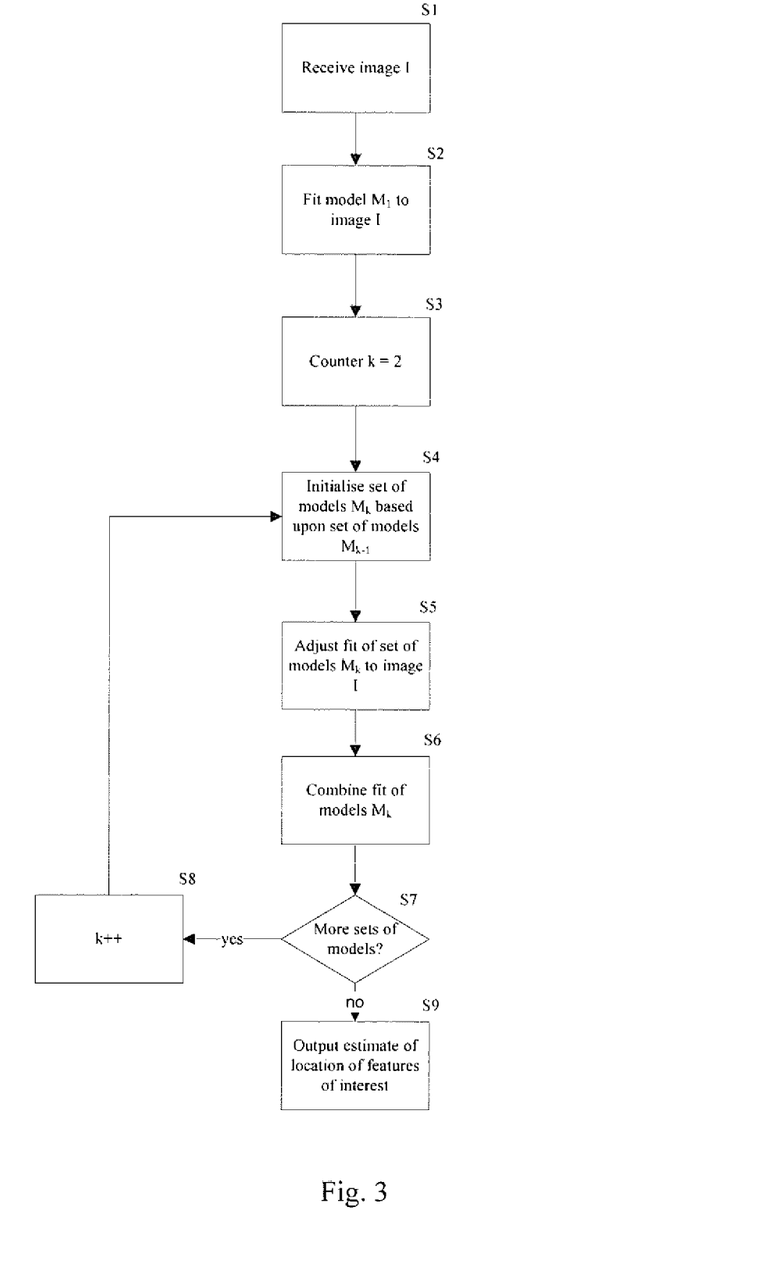
FIG. 3 is a flowchart showing processing carried out to analyse an image in the system of FIG. 1.

Referring now to FIG. 3, processing to fit a model to an image is shown. At step S1 an image I is received and at step S2 a model $M_1$ is fitted to the image I. The model $M_1$ is a statistical model built based upon a training set of images and is a model of features of interest in the image I such as the models described above.

At step S3 a counter k is set to a value 2 and at step S4 each model m of a set of models $M_k$ is initialised in the image I based upon the fit of the model $M_1$. The set of models $M_2$ is a decomposition of an anatomical region modelled by the model $M_1$. That is, each point modelled by each model m corresponds to a point modelled by the model $M_1$, and collectively the set of models $M_2$ model all of the features of interest modelled by the model $M_1$ in the image I. For all values of k, models of the set of models $M_2$ overlap such that each point of the object in the image 2 that is modelled by model $M_1$ is modelled by a plurality of the models m in the set of models $M_2$. Decomposition of the anatomical region modelled by the model $M_1$ to generate a set of models $M_k$ is described in further detail below with reference to FIG. 4.

Initialisation of each model m is performed by fitting points in each model to the image I based upon the fit of corresponding points of the model $M_1$, determined at step S2. Corresponding points are determined using a point correspondence indicating a relationship between points. The point correspondence relates each point modelled by the model $M_1$ to points in models m (for all $M_k$) that correspond to the respective point. In this way, the relationship between points in each model in a set of models $M_k$ is stored, as well as the relationship between points in models $m_k$ in a set of models $M_k$ and models $m_{k+1}$ in a set of models $M_{k+1}$.

At step S5 the fit of each model m to the image I is adjusted based upon properties of the image I and properties of the model m in the same way as the fitting of model $M_1$ described above. Each model m is adjusted independently of any other model m in the set of models $M_k$ and each model m generates an estimate of location of features in the image I that are modelled by m. At step S6 the fits of the models in the set $M_k$ to the image I after the adjustment of step S5 are combined to generate a combined estimate which provides an estimate of the location of each of the features of interest in the image. The combined estimate may take the form of any suitable data. For example the combined estimate may be a geometric indication of the location of each of the features of interest in the image I, or may be a description of the image I indicating the features of interest in the image I, or a combination of both. Combining the fits of the models $M_k$ to generate a combined estimate is described in further detail below with reference to FIG. 5.

At step S7 a check is performed to determine whether there are more sets of models $M_k$ to be fitted to the image. If it is determined that there are more sets of models then at step S8 the counter k is incremented and processing passes to step S4 where the further set of models $M_{k+1}$ is initialised based upon the combined estimate, determined at step S6. Otherwise at step S9 an estimate of location of features of interest is output based upon the combined estimate generated from the set of models $M_k$. Each set $M_{k+1}$ generally contains a greater number of models than the previous set $M_k$ and, in general, models in the set $M_{k+1}$ will model a smaller number of points than models in the set $M_k$. As such, as k increases models in the set $M_k$ will generally model a more localised region of the object and smaller regions of the object will generally be modelled with greater accuracy.

Initialisation of model fitting based upon the combined estimate minimises the risk of a model incorrectly identifying part of the image I as a feature of interest when such a part of the image I is, in fact, not a feature of interest. That is, where a model models a relatively small part of an image, there is a greater chance such a model will fit an incorrect part of an image well. As such, smaller models need better initialisation to avoid false fitting. Use of a hierarchical scheme allows a plurality of models of differing sizes to be applied to an image, such that fitting of relatively large models initializes the fitting of relatively smaller models. Models $M_{i+1}$ at each level of the hierarchy update an estimate generated by a level $M_i$ of the hierarchy.

Figure 4:
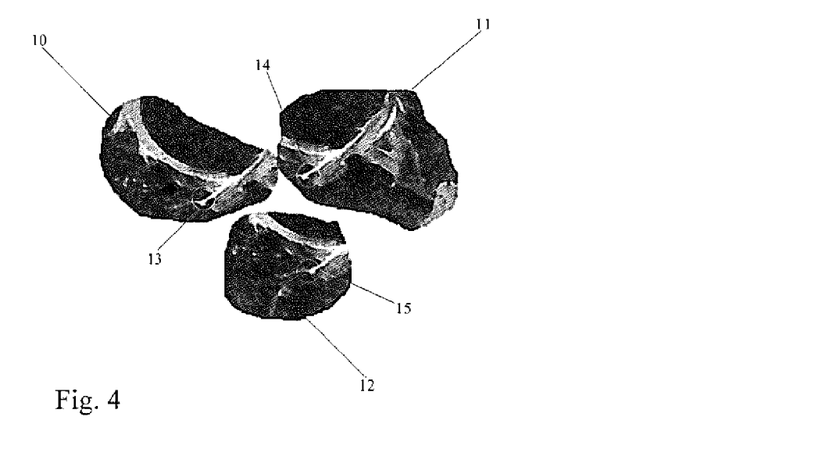
FIG. 4 shows the image of FIG. 2 divided into parts, each of which is modelled by a respective model.

It has been described above that an anatomical region modelled by a model $M_1$ is decomposed, and the decomposition is processed to generate a set of models $M_k$. FIG. 4 illustrates a decomposition of an anatomical region modelled by a model $M_1$ based upon the image of FIG. 2. FIG. 4 shows three regions 10, 11, 12. Each of regions 10, 11, 12 corresponds to part of the image of FIG. 2. Each of regions 10, 11, 12 corresponds to a subset of the points of interest modelled by model $M_1$ and indicates regions of the image of FIG. 2 that correspond to one of the models in the set of models $M_k$. It can be seen that regions 10, 11, 12 overlap so that some points fall within two or three of regions 10, 11, 12. For example image feature 13 of region 10 corresponds to features 14 and 15 of regions 11 and 12 respectively, such that any points corresponding to features 13, 14 and 15 that are modelled by model $M_1$ will be modelled by each of the models corresponding to image regions 10, 11 and 12. It has been found that modelling each image point with between 5 and 15 models in the set of models $M_k$ is effective, although each image point may be modelled in other numbers of models greater than or equal to 2, in a set $M_k$.

In general terms, each set of models $M_k$ is determined by selecting a plurality of points of interest and identifying a region based upon each of the selected points. The set of points selected to form the basis for a model m of the set of models $M_k$ is processed with respect to a training set of images to generate the model m in the manner described above. It will be appreciated that the training set of images used can be the same training set as is used to generate the model $M_1$, or could be a further training set of images which have been parameterised with corresponding points to the points used in the generation of the model $M_1$. In some embodiments a subset of the set of training images may be used to generate each model with each subset selected by randomly sampling with replacement from the set of training images. That is, each model may be generated based upon a randomly selected subset of the training images, wherein the subset selected for generation of a particular model does not affect subsets selected for generation of other models.

The particular points of interest modelled by any model m in a set of models $M_k$ may be selected in any convenient way. For example a segmenter may be used to divide the set of points of interest modelled by an initial model into overlapping subsets. The subsets may be determined by selecting points at random and determining an area of a predetermined size surrounding each selected point in each training image to provide basis for a model. That is, any points falling within the determined area may then be used as a basis for a model of the set of models $M_k$. Points may be chosen in the same way until a desired degree of overlap has been achieved for each of the points to be modelled.

Alternatively, a set of points may be selected that are evenly distributed across an initial model, such that the distance between the selected points is approximately equal. An area surrounding each of the selected points may then be selected and any points of the initial model falling within the area associated with a selected point may be used as a basis for a model of the set of models $M_k$. In this way, the amount of overlap can be controlled such that an even distribution of overlap is achieved.

The initial model may be processed based upon the mean model of the initial model. That is, points from the mean model of the initial model may be used as a basis for generation of further models.

A still further alternative is to select a set of points in an initial model associated with features of interest associated with particular image features. For example, points in regions having a high degree of curvature may be selected and for each selected point a model m may be determined as above, by selecting an area surrounding the selected point and including each point in the area in a model m.

In each of the embodiments described above, in general the size of an area modelled by a model $m_{k+1}$ is selected such that each of the models in a set of models $M_{k+1}$ models a smaller region of interest than a model $m_k$ in the corresponding set of models $M_k$. The size of an area modelled by a model may be chosen based upon, for example, the size of features that it is desired to be accurately modelled at stage k. As such, in some embodiments at least some models in a set of models $M_{k+1}$ may not model a smaller region than models in a corresponding set of models $M_k$. For example where certain features have been shown not to benefit from further decomposition, for example during a training stage, a region selected to model the features may remain relatively large throughout the various sets of models while in other areas relatively small regions may be selected to form the basis of a model.

It will be appreciated that the determination of a set of models $M_k$ is carried out in an initial stage, and as such a relatively large amount of time can be spent in selecting an effective set of models. For example, the above selection methods may each be carried out repeatedly and the efficacy of each set of models $M_k$ that is generated may be tested against images that have been manually marked to determine how well a particular set of models $M_k$ is able to represent variation in the test image data.

Whilst it has been described above that a set of models $M_{k+1}$ generally contains a greater number of models than a set of models $M_k$ and that each model in the set of models $M_{k+1}$ generally model a smaller region of an anatomical region than models in the set of models $M_k$, it will be appreciated, that in general each set of models $M_k$ is selected so as to effectively represent variation in the test image data. In some cases, therefore, a set of models $M_{k+1}$ may contain the same or a smaller number of models than a set of models $M_k$ and/or models in the set of models $M_{k+1}$ may model regions of a similar size or a greater size than patches in a set of models $M_k$ where such choices are able to more effectively represent variation in the test image data.

Figure 5:
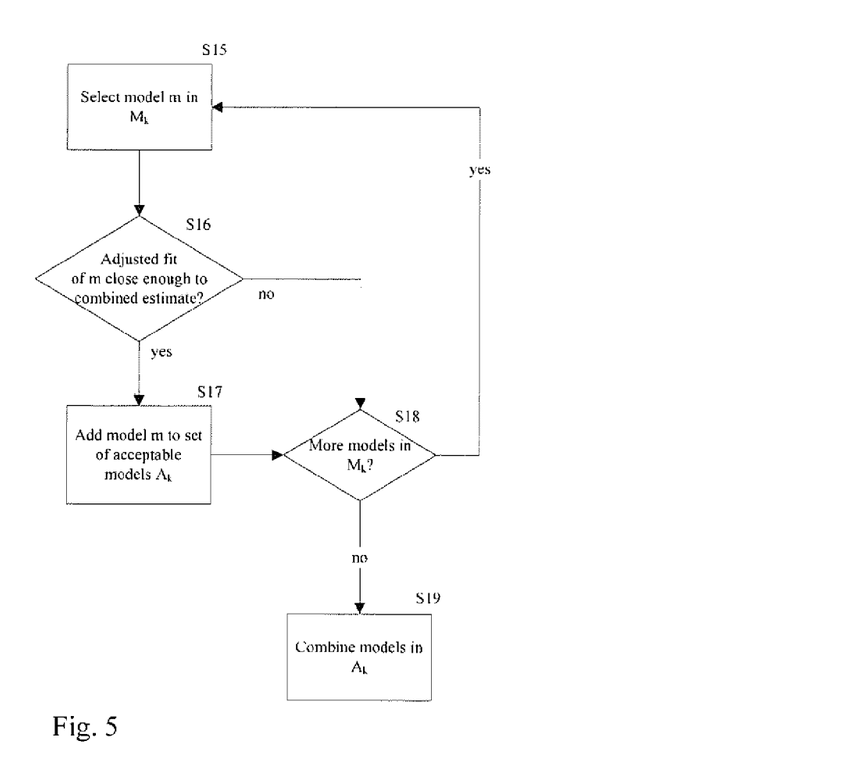
FIG. 5 is a flowchart showing part of the processing of FIG. 3 in further detail.

Referring now to FIG. 5, processing to combine the fits of the models $M_k$ of step S6 of FIG. 3 is shown in further detail. At step S15 a model m in the set of models $M_k$ is selected and at step S16 a check is performed to determine whether the fit of the selected model m is close enough to the fit of corresponding points of the combined estimate generated at step S6 for the set of models $M_{k-1}$. Corresponding points between models and the combined estimate are determined by the point correspondence. Determination of whether the fit of a selected model m is close enough to the fit of corresponding points of the combined estimate generated from the set of models $M_{k-1}$ may be determined in any convenient way. For example a geometric rule may be determined for each region of the object to be modelled. The geometric rule may indicate a maximum distance a model representing the region can move relative to the starting position of the model (as indicated by the combined estimate generated from the set of models $M_{k-1}$) or a maximum number of degrees the model can rotate relative to the starting rotation of the model, or a combination of both. If the model does not exceed the maximum allowed, then the fit of the model is determined to be close enough.

In an alternative embodiment a classification based rejection may be used in which the system is presented with a (preferably large) number of examples of a good fit of a model and a (preferably large) number of examples of a bad fit of a model in a training stage. In this way, the system is able to "learn" characteristics of a good fit and a bad fit based upon residual error between fit achieved by a model and ideal fit.

If it is determined that the fit of the selected model m is close enough, then at step S17 the model m is added to a set of acceptable models $A_k$. If it is determined that the fit of the selected model m is not close enough at step S16 or if the model m has been added to $A_k$ at step S17, processing passes to step S18. At step S18 it is determined if there are previously unselected models in $M_k$. If there are previously unselected models in $M_k$ then processing returns to step S15 where a previously unselected model is selected. Otherwise processing passes to step S19 where the models in the set $A_k$ are combined and used to update the combined estimate. Combination of models is described below with reference to FIGS. 6 and 7.

The processing of FIG. 5 is based upon an assumption that, at each stage, the combined estimate is a reasonably accurate estimate of features in the image I. If after the adjustment of the set of models $M_k$ of step S5 points of a model m in the set of models $M_k$ have been adjusted by greater than a predetermined amount relative to corresponding points of the combined estimate then the model m is rejected as it is assumed that the model has moved too far, and is no longer modelling the correct part of the image. As described above, the set of models $M_k$ overlap such that each point of the region of interest indicated in the combined estimate is modelled by a plurality of the models in $M_k$. Each point in the combined estimate can therefore still, in general, be adjusted based upon the set of models $M_k$ when a model m is rejected.

Figure 6:
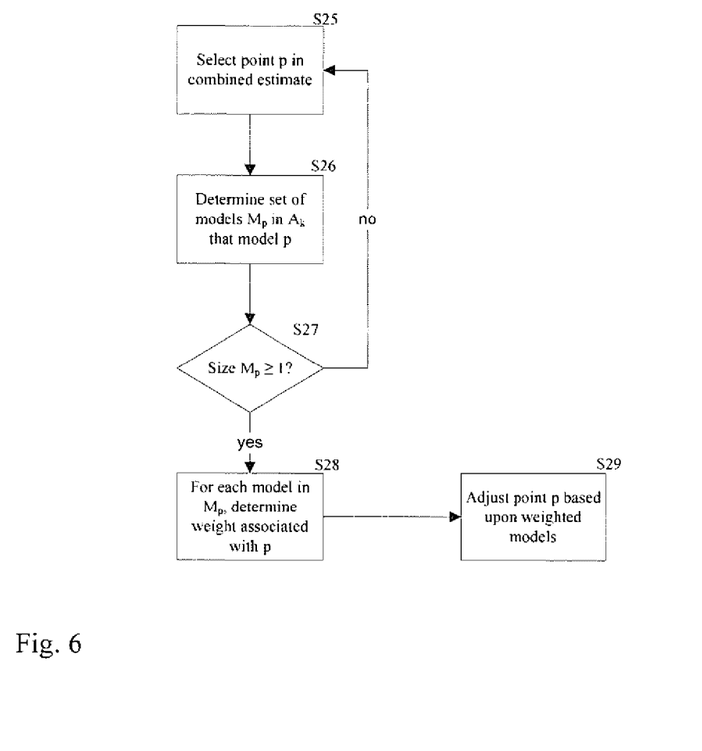
FIG. 6 is a flowchart showing part of the processing of FIG. 5 in further detail.

Referring to FIG. 6 the combination of models and updating of the combined estimate based upon the combination of models of step S19 of FIG. 5 is shown in further detail. At step S25 a point p in the combined estimate is selected and at step S26 a set of models $M_p$ is determined. The set of models $M_p$ is a subset of the set of acceptable models $A_k$ which each model the point p, determined based upon the point correspondence. At step S27 it is determined if the number of models in $M_p$ is greater than or equal to 1. If the number of models in $M_p$ is less than 1 then it is determined that no update can be carried out for the point p in the combined estimate and processing returns to step S25 where a point is selected that has not previously been selected.

If it is determined at step S27 that the number of models in $M_p$ is greater than or equal to 1 then at step S28 a weight $w_m$ is determined for the point p for each model m in $M_p$. Each weight $w_m$ provides a weight for the contribution of a model m to the updating of point p in the combined estimate carried out at step S6 of FIG. 3. Each of the models in the set of models $M_p$ may indicate a different location for point p after the model has been adjusted and a weight $w_m$ determines how much influence a particular model m has upon the total adjustment of a point p in the combined estimate. Determination of a weight $w_m$ for a model m is described below with reference to FIG. 7. At step S29 the point p in the combined estimate is updated based upon the weighted contributions of the point p in each of the models in the set $M_p$. That is, for a particular model point p the fit of p is updated based upon data relating to that point in each model in the set of models $M_p$.

Figure 7:
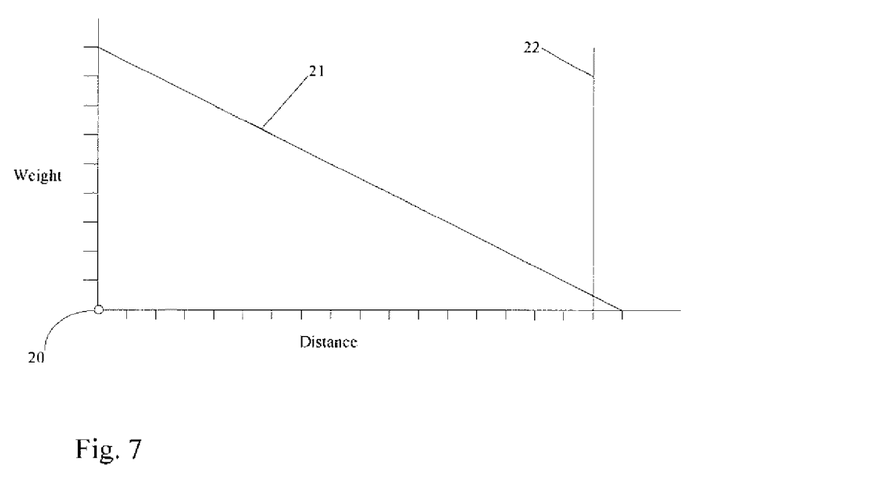
FIG. 7 is a graph illustrating a relationship between a weight applied to a point and a distance of the point from the centre of a model.

Referring now to FIG. 7 variation of a weight $w_m$ with respect to a distance from the centre of a region modelled by a model m is shown. It can be seen that at the centre of a region, indicated by circle 20 the value weight, indicated by line 21, is relatively high compared to the value weight at the edge of a region, indicated by line 22. In this way, where a point p lies relatively close to the centre of a region modelled by a model $m_c$, the contribution to the adjustment of the point p in the combined estimate based upon the model $m_c$ will be relatively high compared to the contribution to the adjustment of the point p in the combined estimate based upon a model $m_e$ in which the point p lies relatively close to the edge of the region modelled by the model $m_e$. The weights w therefore reflect the amount of information used to update a point p in any particular model m since where a point p lies relatively close to the centre of a region modelled by $m_c$, a relatively large amount of information surrounding the point p has been modelled by $m_c$ and therefore used in the determination of the fit of the point p in the model $m_c$. It can be seen that where a point p lies at the edge of a region modelled by a model $m_e$, the weight w is small, but is greater than zero.

It has been described above that a model $M_1$ is first fitted to an image I and a set of models $M_2$, is subsequently fitted to the image I based upon the fit of the model $M_1$. In an alternative embodiment the fitting of the model $M_1$ is avoided, and the combined estimate is first established by a set of models K. That is, in some embodiments a plurality of models are first fitted to the image I and combined to generate a combined estimate, and subsequent sets of models $M_{i+1}$ are fitted to the image I in the manner described above.

It has been described above that a point correspondence indicates a relationship, for each point of interest p, between points in models m which model the point of interest p and a point in a combined estimate which corresponds to the point of interest p. In an alternative embodiment the combined estimate may be a label image in which each point in the combined estimate has a label indicating a structure or feature associated with the point. For example, where it is desirable to identify an anatomical feature such as the femur in an image, some points in the combined estimate may have an associated label indicating that corresponding points in the image I are currently estimated to represent the femur. In this way, fitting a plurality of models to the image I and creation of the combined estimate can be carried out based upon labels. For example, after the set of models $M_k$ has been fitted to the image, each model that models a particular feature contributes to updating the combined estimate such that, after combination of the models, for each point indicated as representing a particular feature in image I, corresponding points in the combined estimate are labelled as representing the particular feature.

Although specific embodiments of the invention have been described above, it will be appreciated that various modifications can be made to the described embodiments without departing from the spirit and scope of the present invention. That is, the described embodiments are to be considered in all respects exemplary and non-limiting. In particular, where a particular form has been described for particular processing, it will be appreciated that such processing may be carried out in any suitable form arranged to provide suitable output data.

The invention claimed is:

1. A computer-implemented method for identifying features in an image, the method being implemented in a computer comprising a memory in communication with a processor, the method comprising:
   identifying a region of interest within the image, the region of interest including a first portion of the image;
   fitting, by the processor, a plurality of second models to said region of interest, each of said plurality of second models modelling a second portion of the region of interest of said image, said plurality of second models together modelling said region of interest, wherein said second portions modelled by said second models overlap such that each part of said region of interest is modelled by at least two of said plurality of second models;
   identifying, by the processor, said features in the region of interest based upon said fit of said plurality of second models; and
   automatically creating, by the processor, a label for a point within the region of interest, the label indicating that the point corresponds to one of the identified features within the image.

2. A method according to claim 1, further comprising:
   initially fitting, by the processor, a first model of said region of interest to said image;
   wherein fitting the plurality of second models is based upon said fitting of said first model.

3. A method according to claim 2, wherein fitting said plurality of second models to said image is initialised based upon said fitting of said first model.

4. A method according to claim 2 wherein fitting said plurality of second models is limited by said fitting of said first model.

5. A method according to claim 1, wherein identifying said features in the image based upon said fit of said plurality of second models comprises:
   combining, by the processor, data based upon said fit of said plurality of second models.

6. A method according to claim 5, wherein combining data based upon said fit of said plurality of second models comprises, for each part of said region of interest, applying, by the processor, an associated weight to data derived from each of said plurality of second models in which said part is included.

7. A method according to claim 6, wherein, for a particular second model, said associated weight is based upon a distance of said part of said region from a point defined with respect to the particular second model.

8. A method according to claim 7, wherein said point defined with respect to the particular second model is defined with respect to a centre of the particular model.

9. A method according to claim 5, wherein a particular feature is modelled by two of said second models and said combining identifies said particular feature by combining data associated with said particular feature generated by fitting each of said two of said second models.

10. A method according claim 5, wherein said combining is based upon stored data indicating a plurality of relationships, each relationship being between at least part of a second model and at least part of at least one other second model.

11. A method according to claim 10, further comprising:
initially fitting, by the processor, a first model of said region of interest to said image; and
fitting, by the processor, the plurality of second models based upon said fitting of said first model;
wherein said stored data indicating a plurality of relationships indicates a relationship between at least part of a second model and part of said first model.

12. A method according to any claim 6, wherein said combining comprises, for each part of said region of interest included in at least two of said plurality of second models, determining a weighted average fit for said part of said region of interest based upon the fit of each of said at least two of said plurality of second models to said part of said region of interest.

13. A method according to claim 1, wherein identifying said features in the image based upon said fit of said plurality of second models further comprises:
determining, by the processor, an estimate of location of said features in said image based upon said fit of the plurality of second models.

14. A method according to claim 13, wherein determining an estimate of location of features in said image comprises:
obtaining, by the processor, an initial estimate of location of said features in said image; and
updating, by the processor, said initial estimate based upon the fit of the plurality of second models.

15. A method according to claim 14, wherein said updating said initial estimate comprises:
updating, by the processor, said initial estimate based upon said fit of one of said second models if the fit of said one of said second models satisfies a predetermined criterion.

16. A method according to claim 15, wherein said predetermined criterion is a relationship between said initial estimate of location of said features and said fit of said one of said second models.

17. A method according to claim 15, wherein said predetermined criterion comprises a geometric criterion.

18. A method according to claim 15, wherein said predetermined criterion is determined for said one of said second models during a training phase, based upon a set of training images.

19. A method according to claim 18, wherein said predetermined criterion is based upon a plurality of data items, each data item representing a fit of said one of said second models to a respective one of said training images.

20. A method according to claim 15, wherein each of said plurality of second models has an associated predetermined criterion.

21. A method according to claim 13, further comprising:
fitting, by the processor, a plurality of third models to said image, said plurality of third models together modelling at least part of said region of interest, said fitting the plurality of third models being based upon said estimate of location of said features; and
identifying, by the processor, said features in the image based upon said fit of said plurality of third models.

22. A method according to claim 21, wherein a given part of said region of interest is modelled by a first number of said second models and a second different number of said third models.

23. A method according to claim 22, wherein said second number is greater than said first number.

24. A method according to claim 1, wherein said plurality of second models is an arbitrary decomposition of said object.

25. A method according to claim 1, further comprising:
generating, by the processor, said plurality of second models.

26. A method according to claim 25, further comprising:
receiving, as input to the processor, a training set of images, each image in the training set of images representing said region of interest;
wherein generating said plurality of second models of said object is based upon said training set of images.

27. A method according to claim 26, wherein each model in said plurality of second models is generated based upon a subset of images in said training set of images, said subset being selected by randomly sampling with replacement from said training set of images.

28. A method according to claim 25, wherein generating said plurality of second models comprises:
generating, by the processor, a plurality of models, each of said plurality of models modelling at least part of said region of interest;
processing, by the processor, said plurality of models with respect to a further training set of images; and
selecting, by the processor, a subset of said plurality of models based upon said processing such that each part of said region of interest is represented by a plurality of models in said subset of models.

29. A method according to claim 28, wherein generating said plurality of second models comprises:
generating, by the processor, a first plurality of second models such that each part of said region of interest is modelled by a plurality of said first plurality of second models;
generating, by the processor, a second plurality of second models such that each part of said region of interest is modelled by a plurality of said second plurality of second models;
processing, by the processor, said first plurality of second models and said second plurality of second models with respect to said further training set of images; and
selecting, by the processor, one of said first plurality and said second plurality of second models of said region of interest based upon said processing.

30. A method according to claim 29, wherein processing said first plurality of second models and said second plurality of second models with respect to a training set of images comprises:
fitting, by the processor, said first plurality of second models to each image in said further training set of images; and fitting, by the processor, said second plurality of second models to each image in said further training set of images;

wherein selecting one of said plurality of second models of said region of interest based upon said processing is based upon said fittings.

31. A method according to claim 25, wherein generating the plurality of second models comprises:

receiving, as input to the processor, data indicating a plurality of points of interest within said region of interest; and generating, by the processor, the or each plurality of second models based upon said received plurality of points of interest.

32. A method according to claim 31, wherein generating the plurality of second models based upon said received data comprises:

for each of said received points of interest, selecting, by the processor, a part of said region of interest of predetermined size, to provide a basis for one of said plurality of models.

33. A method according to claim 31, wherein each part of said region of interest represents a feature of interest.

34. A method according to claim 31, further comprising:

receiving, as input to the processor, a training set of images, each image in the training set of images representing said region of interest; and generating, by the processor, said plurality of second models of said object based upon said training set of images by, for each of said plurality of points, processing a corresponding part of said region of interest in each image in said training set of images.

35. A non-transitory computer readable medium carrying a computer program comprising computer readable instructions configured to cause a computer to carry out a method for identifying features in an image, the method comprising:

fitting a plurality of second models to said image, each of said plurality of second models modelling an image portion of a region of interest of said image, said plurality of second models together modelling said region of interest, wherein said image portions modelled by said second models overlap such that each part of said region of interest is modelled by at least two of said plurality of second models;

identifying said features in the image based upon said fit of said plurality of second models; and automatically creating, by the program, a label for a point within the region of interest, the label indicating that the point corresponds to one of the identified features within the image.

36. A computer apparatus for identifying features in an image, the apparatus comprising:

a memory storing processor readable instructions; and a processor arranged to read and execute instructions stored in said memory;

wherein said processor readable instructions comprise instructions arranged to control the computer to carry out a method comprising:

fitting a plurality of second models to said image, each of said plurality of second models modelling an image portion of a region of interest of said image, said plurality of second models together modelling said region of interest, wherein said image portions modelled by said second models overlap such that each part of said region of interest is modelled by at least two of said plurality of second models;

identifying said features in the image based upon said fit of said plurality of second models; and automatically creating, by the processor, a label for a point within the region of interest, the label indicating that the point corresponds to one of the identified features within the image.

37. A computer-implemented method for identifying features in an image, the method being implemented in a computer comprising a memory in communication with a processor, the method comprising:

fitting, by the processor, a plurality of second models to said image, each of said plurality of second models modelling an image portion of a region of interest of said image, said plurality of second models together modelling said region of interest;

fitting, by the processor, a plurality of third models to said image, each of said plurality of third models modelling an image portion of said region of interest, said plurality of third models together modelling at least part of said region of interest, said fitting said plurality of third models being based upon the fit of said plurality of second models;

identifying, by the processor, said features in said image based upon said fit of said plurality of third models; and automatically creating, by the processor, a label for a point within the region of interest, the label indicating that the point corresponds to one of the identified features within the image.

38. A method according to claim 37, wherein a given part of said region of interest is modelled by a first number of said second models and a second different number of said third models.

39. A method according to claim 38, wherein said second number is greater than said first number.

40. A method according to claim 37, further comprising:

initially fitting, by the processor, a first model of said region of interest to said image;

wherein fitting the plurality of second models is based upon said fitting of said first model.

41. A method according claim 40, wherein fitting said plurality of second models to said image is initialised based upon said fitting of said first model and wherein fitting said plurality of third models to said image is initialised based upon said fitting of said second models.

42. A method according to claim 37, wherein each part of said region of interest is represented by a plurality of said plurality of second models.

43. A non-transitory computer readable medium carrying a computer program comprising computer readable instructions configured to cause a computer to carry out a method for identifying features in an image, the method comprising:

fitting a plurality of second models to said image, each of said plurality of second models modelling an image portion of a region of interest of said image, said plurality of second models together modelling a region of interest;

fitting a plurality of third models to said image, each of said plurality of third models modelling an image portion of said region of interest, said plurality of third models together modelling at least part of said region of interest, said fitting said plurality of third models being based upon the fit of said plurality of second models;

identifying said features in said image based upon said fit of said plurality of third models; and automatically creating, by the computer, a label for a point within the region of interest, the label indicating that the point corresponds to one of the identified features within the image.

44. A computer apparatus for identifying features in an image, the apparatus comprising:
a memory storing processor readable instructions; and
a processor arranged to read and execute instructions stored in said memory;
wherein said processor readable instructions comprise instructions arranged to control the computer to carry out a method comprising:
fitting, by the processor, a plurality of second models to said image, each of said plurality of second models modelling an image portion of a region of interest, said plurality of second models together modelling a region of interest;
fitting, by the processor, a plurality of third models to said image, each of said plurality of third models modelling an image portion of said region of interest, said plurality of third models together modelling at least part of said region of interest, said fitting said plurality of third models being based upon the fit of said plurality of second models;
identifying, by the processor, said features in said image based upon said fit of said plurality of third models; and
automatically creating, by the processor, a label for a point within the region of interest, the label indicating that the point corresponds to one of the identified features within the image.

45. A computer-implemented method of generating a plurality of second models, each of said plurality of second models modelling a portion of a region of interest, the plurality of second models together modelling said region of interest, the method being implemented in a computer comprising a memory in communication with a processor, the method comprising:
generating, by the processor, said plurality of second models such that said portions modelled by said second models overlap such that each part of said region of interest is modelled by a plurality of said plurality of second models;
identifying, by the processor, features in the region of interest based upon said plurality of second models; and
automatically creating, by the processor, a label for a point within the region of interest, the label indicating that the point corresponds to one of the identified features within the image.

46. A method according to claim 45, further comprising:
receiving, as input to the processor, a training set of images, each image in the training set of images representing said region of interest;
wherein generating said plurality of second models of said object is based upon said training set of images.

47. A method according to claim 46, wherein each model in said plurality of second models is generated based upon a subset of images in said training set of images, said subset being selected by randomly sampling with replacement from said training set of images.

48. A method according to claim 45, wherein generating said plurality of second models comprises:
generating, by the processor, a plurality of models, each of said plurality of models modelling at least part of said region of interest;
processing, by the processor, said plurality of models with respect to a further training set of images; and
selecting, by the processor, a subset of said plurality of models based upon said processing such that each part of said region of interest is represented by a plurality of models in said subset of models.

49. A method according to claim 48, wherein generating said plurality of second models comprises:
generating, by the processor, a first plurality of second models such that each part of said region of interest is modelled by a plurality of said first plurality of second models;
generating, by the processor, a second plurality of second models such that each part of said region of interest is modelled by a plurality of said second plurality of second models;
processing, by the processor, said first plurality of second models and said second plurality of second models with respect to said further training set of images; and
selecting, by the processor, one of said first plurality and said second plurality of second models of said region of interest based upon said processing.

50. A method according to claim 49, wherein processing said first plurality of second models and said second plurality of second models with respect to a training set of images comprises:
fitting, by the processor, said first plurality of second models to each image in said further training set of images; and
fitting, by the processor, said second plurality of second models to each image in said further training set of images;
wherein selecting one of said plurality of second models of said region of interest based upon said processing is based upon said fittings.

51. A method according to claim 45, wherein generating the or each plurality of second models comprises:
receiving, as input to the processor, data indicating a plurality of points of interest within said region of interest; and
generating, by the processor, the or each plurality of second models based upon said received plurality of points of interest.

52. A method according to claim 51, wherein generating the or each plurality of second models based upon said received data comprises:
for each of said received points of interest, selecting, by the processor, a part of said region of interest of predetermined size, to provide a basis for one of said plurality of models.

53. A method according to claim 51, wherein each part of said region of interest of a predetermined size is centred on one of said received points of interest.

54. A method according to claim 51, wherein each part of said region of interest represents a feature of interest.

55. A method according to claim 51, further comprising:
receiving, as input to the processor, a training set of images, each image in the training set of images representing said region of interest; and
generating, by the processor, said plurality of second models of said object based upon said training set of images by, for each of said plurality of points, processing a corresponding part of said region of interest in each image in said training set of images.

56. A non-transitory computer readable medium carrying a computer program comprising computer readable instructions configured to cause a computer to carry out a method of generating a plurality of second models, each of said plurality of second models modelling a portion of a region of interest, the plurality of second models together modelling said region of interest, the method comprising:

generating said plurality of second models such that said portions modelled by said second models overlap such that each part of said region of interest is modelled by a plurality of said plurality of second models; and identifying, by the processor, features in the region of interest based upon said plurality of second models; and automatically creating, by the processor, a label for a point within the region of interest, the label indicating that the point corresponds to one of the identified features within the image within an image.

57. A computer apparatus for generating a plurality of second models, each of said plurality of second models modelling a portion of a region of interest, the plurality of second models together modelling said region of interest, the apparatus comprising:

a memory storing processor readable instructions; and a processor arranged to read and execute instructions stored in said memory;

wherein said processor readable instructions comprise instructions arranged to control the computer to carry out a method comprising:

generating, by the processor, said plurality of second models such that said portions modelled by said second models overlap such that each part of said region of interest is modelled by a plurality of said plurality of second models; and identifying, by the processor, said features in the region of interest based upon said plurality of second models; and automatically creating, by the processor, a label for a point within the region of interest, the label indicating that the point corresponds to one of the identified features within an image.

58. A method according to any claim 1, wherein said image or each image of said plurality of images is an image selected from the group consisting of: a computed topography image, a magnetic resonance image, a radiograph image, an x-ray image and an ultrasound image.

59. A method according to claim 1, wherein said fitting comprises applying a fitting technique selected from the group consisting of: rigid registration, non-rigid registration, active shape modelling and active appearance modelling.

60. A method according to claim 1, wherein said models are selected from the group consisting of: statistical models, deformable templates and deformable atlases.

61. A method according to claim 60, wherein said models are selected from the group consisting of: shape models and appearance models.

62. A method according to claim 60, wherein said models are appearance models of a volume or of a surface.

63. A method according to claim 1, wherein said plurality of second models represent an arbitrary decomposition of said object.

* * * * *